US007866558B2

(12) United States Patent
Good

(10) Patent No.: US 7,866,558 B2
(45) Date of Patent: Jan. 11, 2011

(54) LASER SCANNER

(75) Inventor: Timothy A. Good, Clementon, NJ (US)

(73) Assignee: Metrologic Instruments, Inc., Blackwood, NJ (US)

( * ) Notice: Subject to any disclaimer, the term of this patent is extended or adjusted under 35 U.S.C. 154(b) by 0 days.

(21) Appl. No.: 12/419,540

(22) Filed: Apr. 7, 2009

(65) Prior Publication Data
US 2010/0252634 A1 Oct. 7, 2010

(51) Int. Cl.
G06K 7/10 (2006.01)
G11B 7/10 (2006.01)
G02B 26/08 (2006.01)
G02B 26/10 (2006.01)
G02B 26/12 (2006.01)

(52) U.S. Cl. .................. 235/462.38; 235/462.01; 359/201.1; 359/202.1; 359/196.1

(58) Field of Classification Search ........... 235/462.01–462.49; 359/201.1, 202.1, 196.1, 359/221.1
See application file for complete search history.

(56) References Cited

U.S. PATENT DOCUMENTS

| 4,699,447 | A | 10/1987 | Howard |
| 4,871,904 | A | 10/1989 | Metlitsky et al. |
| 4,967,076 | A | 10/1990 | Schuhmacher et al. |
| 4,971,410 | A | 11/1990 | Wike, Jr. et al. |
| 5,177,347 | A | 1/1993 | Wike, Jr. et al. |
| 5,196,696 | A | 3/1993 | Lindacher |
| 5,221,832 | A | 6/1993 | Collins, Jr. et al. |
| 5,280,165 | A | 1/1994 | Dvorkis et al. |
| 5,367,151 | A | 11/1994 | Dvorkis et al. |
| 5,371,347 | A | 12/1994 | Plesko |
| 5,422,471 | A | 6/1995 | Plesko |
| 5,477,043 | A | 12/1995 | Dvorkis |
| 5,481,099 | A | 1/1996 | Dvorkis |
| 5,519,198 | A | 5/1996 | Plesko |
| 5,561,283 | A | 10/1996 | Dvorkis et al. |
| 5,614,706 | A | 3/1997 | Bard et al. |
| 5,637,856 | A | 6/1997 | Bridgelall et al. |
| 5,837,988 | A | * 11/1998 | Bobba et al. ............ 235/472.01 |
| 5,988,508 | A | 11/1999 | Bridgelall et al. |
| 6,129,280 | A | 10/2000 | De Renzis et al. |
| 6,142,379 | A | 11/2000 | Bard et al. |
| 6,247,647 | B1 | 6/2001 | Courtney et al. |
| 6,439,461 | B2 | 8/2002 | Dvorkis et al. |
| 6,619,548 | B1 | 9/2003 | Itoh et al. |
| 7,128,268 | B1 | 10/2006 | Fabian |
| 7,154,650 | B2 | 12/2006 | Lettington |
| 7,431,215 | B2 | 10/2008 | Wilz, Sr. et al. |

* cited by examiner

Primary Examiner—Michael G Lee
Assistant Examiner—Laura Gudorf
(74) Attorney, Agent, or Firm—Thomas J. Perkowski, Esq., P.C.

(57) ABSTRACT

A laser scanning system and method for scanning symbology targets such as barcodes. The scanning system in one embodiment includes at least one laser source and a pair of wobbling mirrors generally disposed towards opposite ends of a centrally-positioned rotatable mirrored spinner. In one embodiment, the central spinner is double-sided having reflecting surfaces on opposites sides thereof. Laser beams projected onto each wobbling mirrors are in turn redirected onto each reflecting surface of the double-sided rotating spinner which produces a pair of rotating scanning beams for reading a symbology target.

17 Claims, 7 Drawing Sheets

LASER SCANNER

FIELD OF THE INVENTION

The present invention relates to symbology scanning systems, and more particularly to laser barcode scanners.

BACKGROUND

Barcode readers or scanners are found in many commercial environments such as, for example, point-of-sale stations in retail stores and supermarkets, inventory and document tracking, and diverse data control applications. To meet the growing demands, barcode symbol readers of various types have been developed for scanning and decoding barcode symbol patterns and producing symbol character data for use as input in automated data processing systems. Barcode scanners generally are available in hand-held, hands-free or in-counter formats.

One type of conventional barcode scanner is a laser scanner that generates a light beam which is scanned across a barcode. Light is reflected back to the scanner from the barcode. The reflected light is collected by a light-sensitive photodetector such as a photodiode which generates voltage signals corresponding to the varying intensity of the received light. The photodiode has associated circuitry that converts the analog light wave signals into a digitized signal representing the barcode. The digitized signal is then decoded by the circuitry and the barcode is interpreted or read.

Conventional laser barcode scanners include a laser source or generator such as a solid state visible laser diode (VLD) that generates a visible laser beam directed at the target barcode. The laser beam may be focused and collimated to produce a scanning beam for reading the target barcode. In some designs, the laser beam is projected onto and reflected from a mirrored device having a one-sided central spinning or rotating mirror that produces a raster or rasters comprised of multiple scanning lines each. These designs generally include a single laser beam which is projected onto one side of the spinning or rotating mirror ("spinner"), and then in turn onto the multiple stationary pattern mirrors as the laser beam is reflected from the spinner to produce a scanning pattern or raster field. The number of scanning beams or lines produced in the raster field and pattern affects the scanning efficiency, with generally the more lines and/or various high-density scanning patterns producing greater effectiveness in reading the target barcode when presented to the scanner in various orientations. Some examples of these central spinner type laser scanners are shown in U.S. Pat. Nos. 4,971,410; 5,196,696; and 5,221,832, which are incorporated herein by reference in their entireties.

Another type of laser scanner employs a rotating mirrored polygon having a plurality of mirrored facets disposed at various angles to each other. The laser is projected onto the rotating polygon and then in turn onto stationary pattern mirrors as the laser beam is reflected from the polygon to produce a scanning pattern or raster field. Some examples of the foregoing mirrored polygon designs are shown in U.S. Pat. Nos. 7,431,215 and 6,129,280, which are incorporated herein by reference in their entireties.

Some of the possible scanning patterns produced by the foregoing laser scanners are shown for example in U.S. Pat. No. 5,988,508, which is incorporated herein by reference in its entirety. The possible patterns produced include various raster patterns and high-density scanning patterns that may include rotating line, rosettes, and various Lissajous patterns. These various patterns are produced by varying the number, type, placement, and orientation of the mirrors.

The foregoing conventional rotating scanning polygons having multi-faceted pattern mirrors, however, have drawbacks. The mirrored polygons and their related mirrored facets are sometimes difficult to mold with precision and repeatability because of the upward and downward facing facets. Accordingly, an improved laser scanning system is desired.

SUMMARY

A laser scanning system according to one embodiment of the present invention produces two independent scanning raster fields from a single optically and mechanically simple scanning element. In one embodiment, the scanning element is a double-sided rotating mirror or spinner as further described herein.

In contrast to conventional multi-faceted mirrored polygon laser scanner designs, embodiments of the present invention advantageously are intended to produce more uniform scanning beam motion through a complete 360 degrees of rotation.

According to one embodiment, a laser scanning system includes: at least one laser source producing a pair of laser beams; a double-sided spinner having a first and a second reflecting surface disposed on opposites sides of the spinner, the spinner being rotatable about a rotational axis, wherein each reflecting surface is positioned to receive and project one of the pair of laser beams therefrom to form a pair of scanning beams operable to illuminate a symbology target. In one embodiment, the laser scanning system further includes at least one rotatable wobbling mirror positioned between the laser source and one of the reflecting surfaces, the wobbling mirror being rotated about an axis and being operative to receive and project one of the laser beams onto one of the reflecting surfaces. In another embodiment, the laser scanning system further includes a first directional mirror axially aligned with the rotational axis of the spinner and in optical view of the first reflecting side of the spinner, the directional mirror being positioned between the wobbling mirror and the first reflecting side and being operative to receive and project one of the laser beams onto the first reflecting side of the spinner. In yet another embodiment, the laser scanning system further includes a first and a second set of pattern mirrors, the first set being positioned to receive the scanning beams from the first reflecting side of the spinner and the second set being positioned to receive the scanning beams from the second reflecting side of the spinner. The first and second sets of pattern mirrors may each comprise at least a partial ring of faceted reflecting surfaces or mirrors.

According to another embodiment, a laser scanning system includes: a pair of rotatable wobbling mirrors each being rotatable about an axis; a double-sided mirrored spinner centrally positioned among the wobbling mirrors, the spinner having a first and a second reflecting surface disposed on opposites sides thereof and being rotatable about a rotational axis. A laser beam is projected from one or more laser sources onto each reflecting surface of the spinner via the wobbling mirrors to produce a pair of rotating scanning beams for illuminating a symbology target.

According to another embodiment, a laser scanning system includes: a housing; a rotatable double-sided mirror having a first reflecting side and a second reflecting side, the double-sided mirror being rotatable about a rotational axis; a first directional mirror axially aligned with the rotational axis and in optical view of the first reflecting side of the double-sided mirror; a second directional mirror axially aligned with the rotational axis and in optical view of the second reflecting side of the double-sided mirror; a first rotatable wobbling mirror positioned to receive a first laser beam and reflect the first beam to the first directional mirror; and a second rotatable wobbling mirror positioned to receive a second laser beam and reflect the second beam to the second directional mirror. The first laser beam is transmitted onto the first reflecting side of the double-sided mirror via the first wobbling mirror and the first directional mirror to produce a first scanning beam, and the second beam is transmitted onto the second reflecting side of the double-sided mirror via the second wobbling mirror and the second directional mirror to produce a second scanning beam.

BRIEF DESCRIPTION OF THE DRAWINGS

The features of the preferred embodiments will be described with reference to the following drawings where like elements are labeled similarly, and in which.

DETAILED DESCRIPTION

Figure 1:
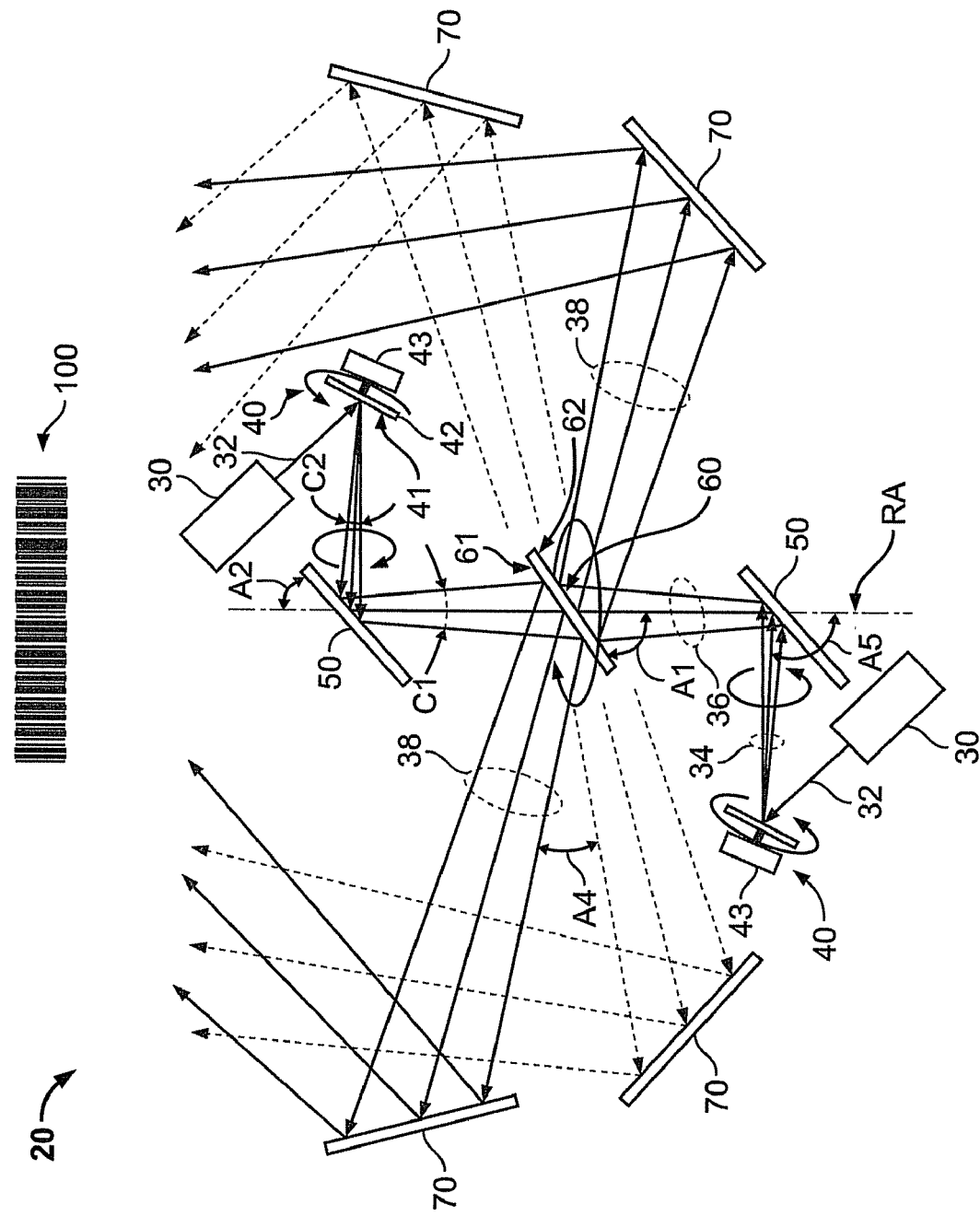
FIG. 1 is a schematic diagram of a laser scanning system according to one embodiment of the present invention.

This description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation. Terms such as "attached," "affixed," "connected" and "interconnected," refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the preferred embodiments. Accordingly, the invention expressly should not be limited to such preferred embodiments illustrating some possible non-limiting combination of features that may exist alone or in other combinations of features; the scope of the invention being defined by the claims appended hereto.

As the term is used herein, "mirror" shall be construed to mean any reflective surface made of any material or combination of materials that is capable of specular reflection of light therefrom.

In one embodiment, a laser scanning mechanism according to the present invention replaces the conventional mirrored polygon mechanism described before with a mechanically simple scanning mechanism that is capable of producing high-density, complex scanning patterns intended to increase the effectiveness of barcode reading.

Figure 4:
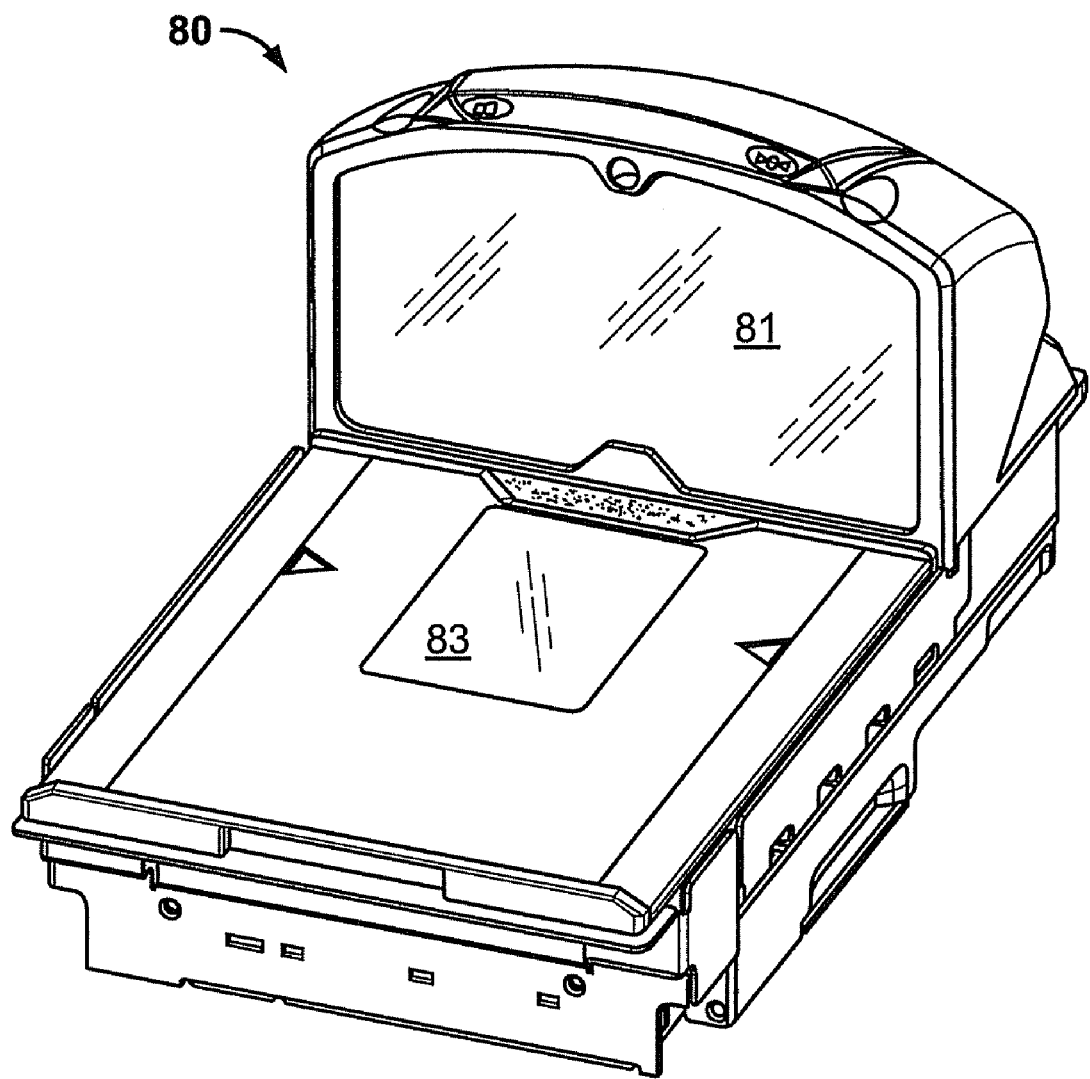
FIG. 4 is a perspective view of one possible embodiment of a fixed-mount or stationary scanner housing that may house the laser scanning system of FIG. 1.
Figure 5:
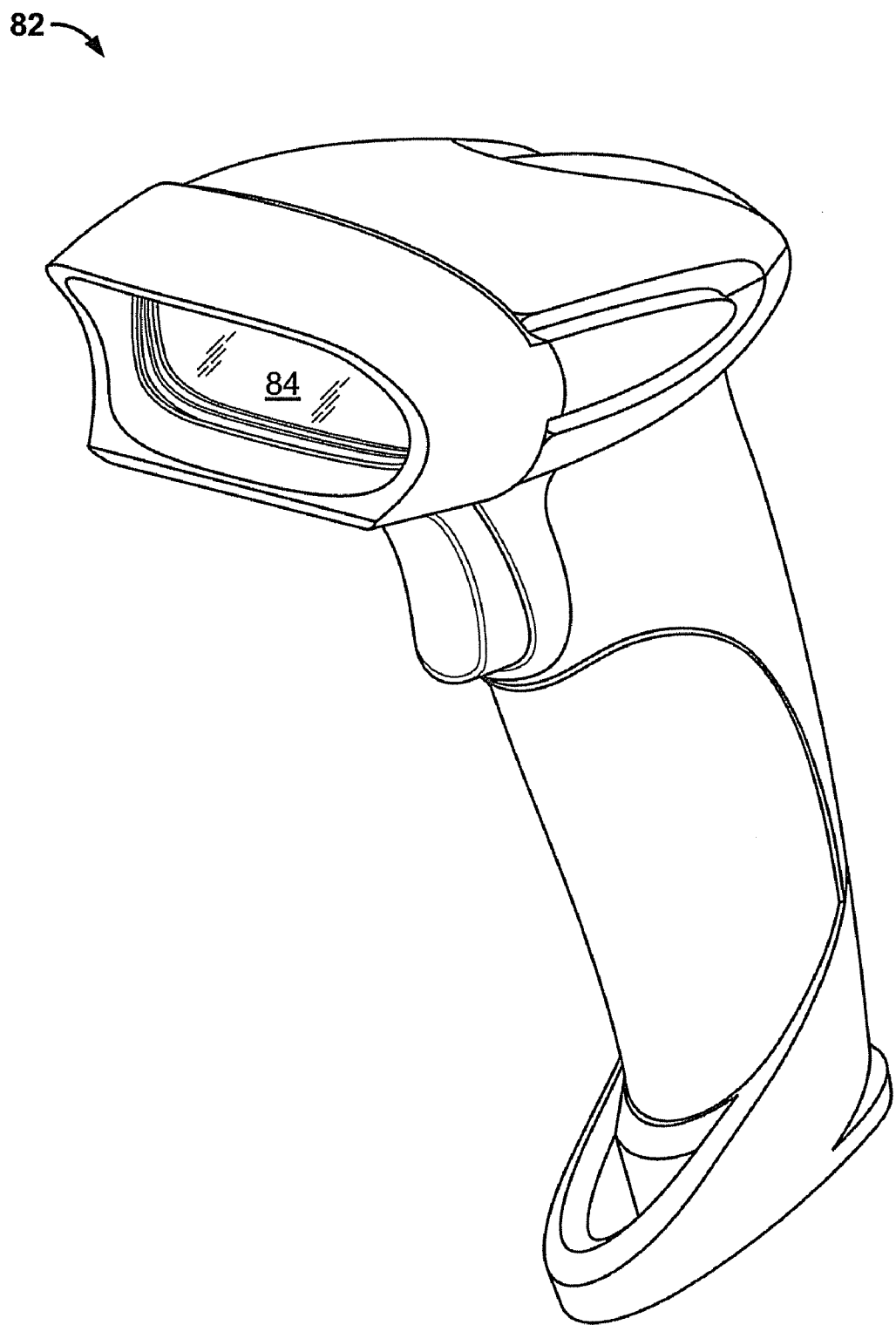
FIG. 5 is a perspective view of one possible embodiment of a portable hand-held scanner housing that may house the laser scanning system of FIG. 1.

FIG. 1 is a schematic diagram of one embodiment of a laser scanning system 20 according to the present invention. Laser scanning system 20 includes a centrally-positioned double-sided rotating mirror or central spinner 60, a first and second deflector or directional mirror 50, a first and second wobbling mirror 40, and a plurality of pattern mirrors 70. Laser scanning system 20 further conventional light collection elements (e.g. photodiode, etc.) and associated electronics commonly found in scanners such as signal processing circuitry as will be readily known to those skilled in the art for receiving light reflected from a barcode target 100 and decoding the target. Scanning system 20 and the foregoing components may be mounted in any type of housing, such as stationary or fixed housings 80 as shown in FIG. 4 for example which is representative of Stratos series of fixed-mount scanners available from Metrologic Instruments, Inc. (division of Honeywell). In other embodiments, scanning system 20 may be mounted in portable hand-held housings 82 such as shown in FIG. 5 for example which is representative of Voyager series of hand-held scanners or Fusion series of hand-held scanners shown in U.S. Pat. No. 7,431,215 (incorporated herein by reference in its entirety), both available from Metrologic Instruments, Inc. Accordingly, the scanning system 20 may be embodied in other suitable housing configurations and the invention is not limited by the type of housing used to mount laser scanning system 20.

Scanning system 20 further includes at least one conventional light source such as a laser source or generator, which in one embodiment may be a semiconductor laser diode 30. Laser diode 30 generates a laser beam 32 along an optical path. In a preferred embodiment, two laser diodes 30 may be provided which produce two discrete laser beams 32 each being projected along a different optical path toward optical elements, as shown in FIG. 1. In other embodiments (not shown), a single laser diode 30 may be used in combination with a splitter and reflectors to divide and direct the single laser beam 32 generated into preferably two laser beams 32.

Figure 2:
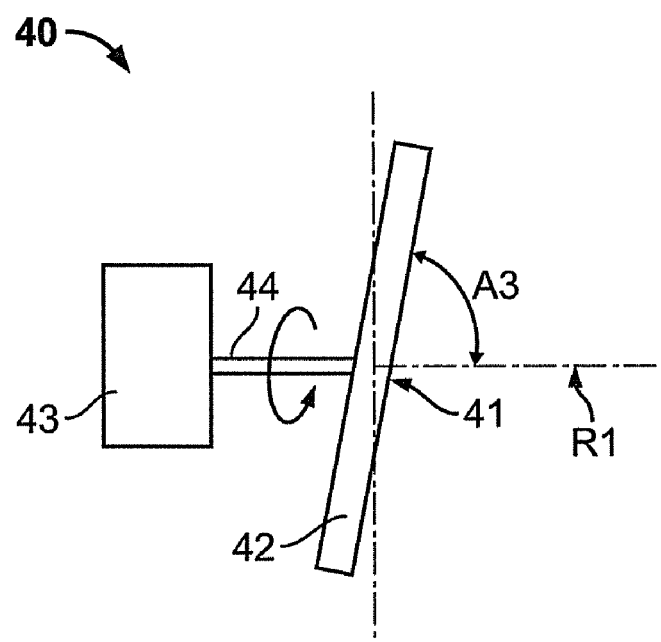
FIG. 2 is side view of a tilting or wobbling mirror assembly of FIG. 1.
Figure 3:
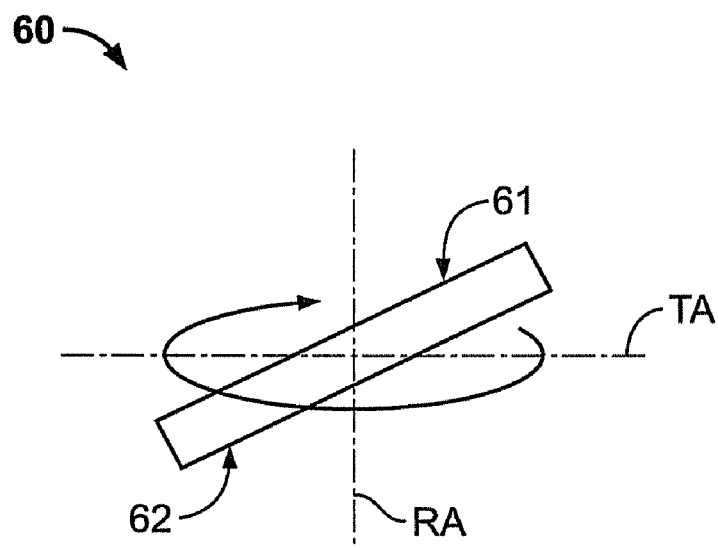
FIG. 3 is a side view of a double-sided rotating mirror of FIG. 1.
Figure 6:
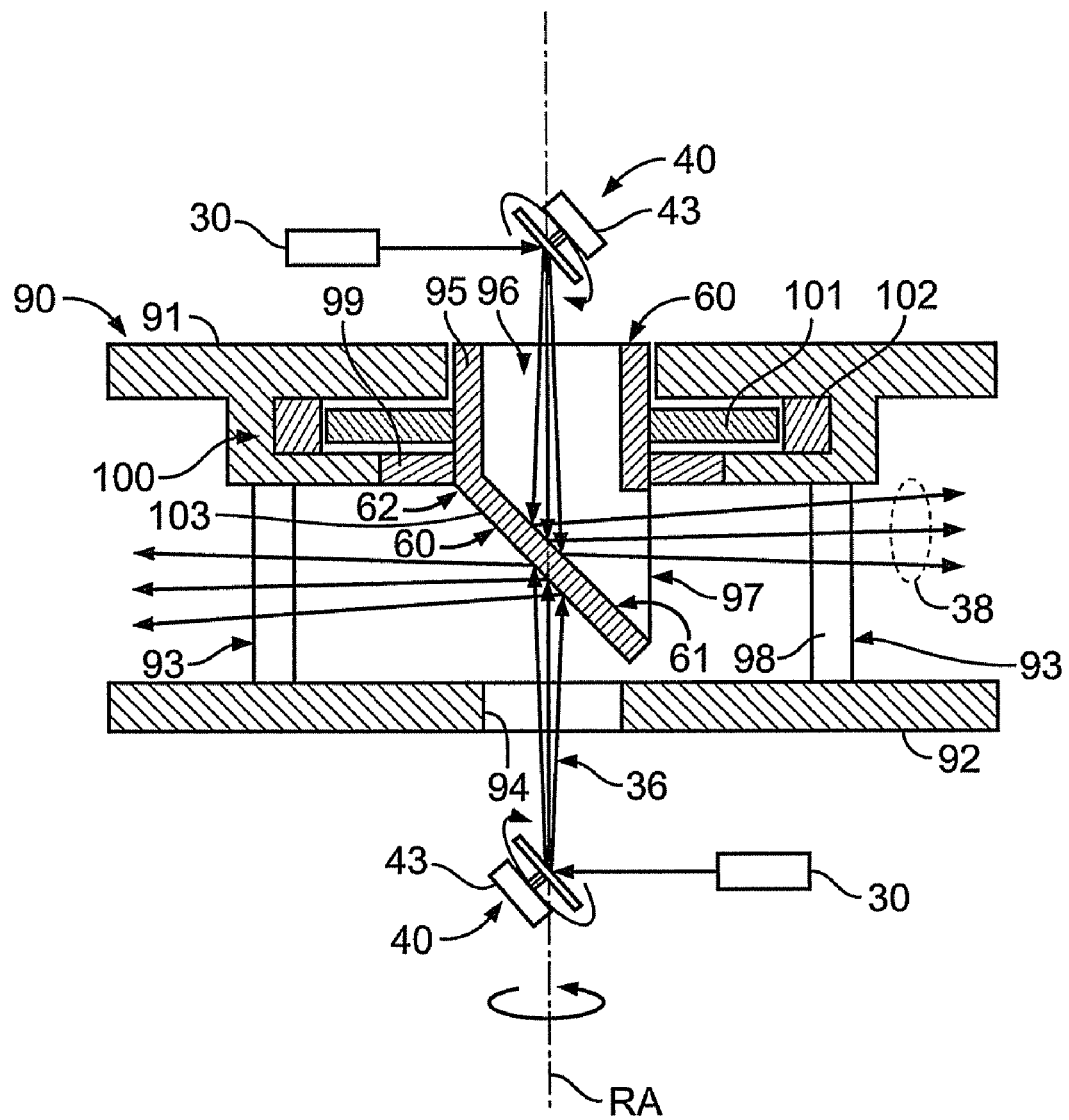
FIG. 6 is a cross-sectional side view of a housing for supporting the double-sided rotating mirror of FIG. 1.

Referring to FIGS. 2-3 and 6, double-sided central spinner 60 defines rotational axis RA as shown about which mirror 60 is rotated and a transverse axis TA perpendicular thereto (see FIG. 2). Central spinner 60 preferably includes first and second reflecting surfaces 61, 62 respectively. In one embodiment, reflecting surfaces are disposed on opposite sides of central spinner 60 and are preferably planar or flat. Central spinner 60 is preferably disposed at angle A1 to rotational axis RA for reflecting the laser beam laterally outwards at an angle to the rotational axis. In a preferred embodiment, central spinner 60 rotates through a full 360 degrees producing a scanning beam 38 that concomitantly rotates through a full 360 degrees. In one embodiment, scanning beam 38 produced by central spinner 60 sweeps through an approximately shallow conically-shaped path.

Referring to FIGS. 2-3 and 6, central spinner 60 may be driven by a standard commercially-available drive motor 100 with a central hollow shaft as will be readily known to those skilled in the art. In one embodiment, central spinner 60 forms the central element of scanning system 20 around which the other elements described herein are distributed and aligned. Central spinner 60 forms the scanning beams 38 as shown in FIG. 1 which are guided and directed by pattern mirrors 70 towards a barcode target 100 to be read by scanner system 20.

Referring to FIG. 6, central spinner 60 may be rotatably supported in a housing 90 having an upper portion 91 and lower portion 92. In one possible embodiment as shown, central spinner 60 may be supported from upper portion 91 of housing 90. In other embodiments, central spinner 60 may be supported from lower portion 92 of housing 90 having an opposite arrangement from that shown in FIG. 6. Housing 90 further includes a lower aperture 94 for admitting reflected laser beams such as first or second reflected laser beams 34 or 36 from one of the wobbling mirrors 40 or directional mirror 50, respectively, depending on whether directional mirrors are optionally provided. Housing 90 further includes side or lateral openings 93 for projecting scanning beams 38 outwards from central spinner 60. In one possible embodiments, lateral openings 93 may circumferentially extend around housing 90 in substantially an entire 360 degree circle (except for some possible interim vertical support members 98 connecting and mutually supporting the upper and lower housing portions 91, 92) to generate a 360 degree scanning beam 38 pattern.

Referring to FIGS. 2-3 and 6, central spinner 60 may include a tube portion 95 having an axial opening 96 at one end and an angled portion 103 at an opposite end on which reflecting surfaces 61, 62 are disposed. Tube portion 95 may further define a lateral opening 97 opposite axial opening 96 for projecting scanning beam 38 outwards from reflecting surface 61.

In one embodiment, referring to FIG. 6, central spinner drive motor 100 may be incorporated into and form at least part of upper portion 91 of housing 90. Tube portion 95 of central spinner 60 may form the motor spindle having motor windings 101 formed thereon with motor stator 102 being disposed in upper portion 91 of housing 90. Tube portion may be supported for rotational movement in motor 100 via conventional bearings 99. Central spinner 60 is rotatable in relation to housing 90. Conventional motor wiring leads and other appurtenances may be provided.

Referring now to FIGS. 1 and 2, wobbling mirrors 40 (also referred to sometimes as tilting mirrors) are combination drive-mirror assemblies of conventional design as will be readily known to those skilled in the art, such as those shown for example in U.S. Pat. Nos. 4,871,904 and 5,221,832 which are incorporated herein by reference in their entireties. In one embodiment, wobbling mirror 40 includes a rotatable mirror 42 disposed at a tilt angle A3 to an axis of rotation R1 other than 90 degrees or perpendicular (as best shown in FIG. 2) to impart a wobbling motion to the mirror as it rotates. The tilt angles A3 are typically very small and need only be large enough to impart a wobbling motion to mirror 42 capable that will generate a cone of light from a focused laser beam incident thereon for producing a Lissajous scanning pattern. In one non-limiting representative example, tilt angle A3 may be about 2 degrees. In one embodiment, wobbling mirror 40 is attached at tilt angle A3 to a rotating shaft 44 driven by a suitable motor drive 43; the shaft defining the axis of rotation R1. Motor drive 43 may be any suitable constant or variable speed drive controlled by a suitable motor controller. Motor drive 43 may be unidirectional or bidirectional and capable of rotating reflective surface 42 in either circumferential direction at a plurality of angular speeds.

It will be appreciated that the angular speed at which central spinner 60 and wobbling mirrors 40 are rotated by their respective motor drives may be varied in magnitude and/or direction of rotation to vary the scanning pattern and speed. Accordingly, the rotational speed and/or direction of rotation of spinner 60 and wobbling mirrors 40 may be the same or different in various embodiments depending on the intended scanning pattern design to be produced.

Referring to FIGS. 1 and 2, in one possible embodiment, wobbling mirrors 40 are preferably positioned and aligned in the scanner housing (see, e.g. FIGS. 3 and 4) to be laterally offset from central spinner 60 and its rotational axis RA. Accordingly, neither axis R1 of either wobbling mirror 40 aligns with or is parallel to rotational axis RA of central spinner 60. As further described herein, wobbling mirrors 40 may be positioned and oriented in one embodiment such that a first reflected laser beam 34 created by striking mirror 42 with laser beam 32 from laser diode 30 is reflected from reflecting surface 41 and projected in a direction along an optical path towards and generally perpendicular in angle A5 (i.e. approximately 90 degrees) to rotational axis RA as shown in FIG. 1.

First and second wobbling mirrors 40 may be mounted and positioned on opposite sides of rotational axis RA of central spinner 60 in some embodiments as shown in FIG. 1. In other embodiments (not shown), first and second wobbling mirrors 40 may be positioned on the same side of rotational axis RA wherein one of the directional mirrors 50 shown in FIG. 1 would preferably be oriented in an opposite angular direction from that shown such that the laser beam incident thereon is reflected towards central spinner 60.

In operation, as mirror 42 of wobbling mirror 40 is rotated by shaft 44, reflecting surface 41 disposed on mirror 40 will have an undulating or wobbling motion (when viewed from the side) with respect to the axis of rotation R1 such that a focused light beam incident on surface 41 will form a reflected light cone as further described herein. In one embodiment, reflecting surface 41 is preferably planar or flat. In other possible embodiments, reflecting surface 41 may be curved (not shown) if a change in focus of the laser beam 32 is desired. A laser generator such as laser diode 30 is preferably positioned and aligned to project a focused laser beam 32 along a first optical path onto reflecting surface 41 in a manner further described herein. Wobbling mirror 40 preferably intercepts laser beam 32, and reflects the beam to form a first reflected laser beam 34 comprising a light cone which is redirected along a second optical path at an angle to the first optical path. In one possible embodiment, laser beam 34 may be transmitted towards rotational axis RA of central spinner 60 when wobbling mirrors 40 are disposed laterally offset from rotational axis RA as shown in FIG. 1.

Referring to FIG. 1, directional mirrors 50 are preferably axially aligned along the rotational axis RA of central spinner 60 and positioned to intercept the first reflected laser beam 34 from wobbling mirrors 40. Directional mirrors 50 are each in optical view and communication with both central spinner 60 and one of the wobbling mirrors 40. Accordingly, directional mirrors 50 are further preferably positioned and aligned in scanner system 20 to receive first reflected laser beams 34 from wobbling mirrors 40 and in turn produce a second reflected laser beam 36 that is projected along a third optical path towards central spinner 60 that is generally parallel to rotational axis RA (see FIG. 1). In one embodiment, therefore, directional mirrors 50 are preferably disposed at an angle A2 inclined to rotational axis RA to receive reflected laser beams 34 and project second reflected laser beams 36 onto central spinner 60. A suitable angle A2 may readily be determined by those skilled in the art and will be dependent on the position and placement of wobbling mirror 40 and central spinner 60 so that the second reflected laser beam 36 is projected towards central spinner 60 along rotational axis RA. In a preferred embodiment, directional mirrors 50 are preferably fixed or stationary in position with respect to rotational axis RA of central spinner 60, in contrast to rotatable wobbling mirrors 40 and central spinner 60.

In a preferred embodiment, one directional mirror 50 each is positioned on opposite ends of central spinner 60 and opposite sides of transverse axis TA (see FIGS. 1 and 3).

In a preferred embodiment, a pair of optical elements each comprising at least a wobbling mirror 40 and a directional mirror 50 are mounted on opposite sides or ends of central spinner 60 so that a second reflected laser beam 36 from each directional mirror may strike opposite sides of central spinner 60 on first or second reflecting surfaces 61, 62 as shown in FIG. 1. This provides two independent second reflected laser beams 36 to central spinner 60 from opposite directions.

Operation of laser scanning system 20 will now be described with reference to FIG. 1 and a single set of laser generation and reflection elements. In one embodiment, a focused laser beam 32 is generated by laser diode 30 and projected along a first optical path towards wobbling mirror 40. The focused laser beam 32 strikes rotating and undulating reflecting surface 41 of wobbling mirror 40 creating first reflected laser beam 34. As laser beam 32 strikes undulating reflecting surface 41, however, first reflected laser beam 34 forms a slightly spreading but generally narrow light cone as illustrated in FIG. 1 which would form a rapidly rotating circular locus or pattern of light if projected onto a reference surface or plane disposed generally perpendicular to beam 34 and its optical path.

With continuing reference to FIG. 1, the first reflected conical laser beam 34 or light cone leaves wobbling mirror 40 at an angle perpendicular to rotational axis RA of central spinner 60 along a second optical path as described herein and strikes directional mirror 50. Directional mirror 50 in turn produces second reflected conical laser beam 36 which is projected along a third optical path parallel to rotational axis RA and onto reflecting surface 61 or 62 of central spinner 60 as described herein.

With continuing reference to FIG. 1, since reflecting surfaces 61 or 62 of central spinner 60 are each disposed at an angle A1 to rotational axis RA, a laser scanning beam 38 is produced that may be directed towards a barcode target 100 intended to be read or decoded. In one embodiment, angle A1 is greater than or equal to 45 degrees minus half of the cone angle C1 of second reflected laser beam 36 originally produced by wobbling mirrors 40 and redirected by directional mirrors 50. Cone angle C1 is approximately the same as a corresponding cone angle C2 of first reflected conical laser beam 34 or light cone leaving wobbling mirror 40. Rotation of central spinner 60, which preferably is double-sided with reflecting surface 61 or 62 disposed on opposite sides of mirror 60 and struck by two separate opposing second reflected laser beams 36 or light cones as shown, produces two laser scanning beams 38 along a fourth and fifth optical path. These two scanning beams 38 each circumferentially sweep a full 360 degrees around a complete circle in a direction laterally outwards from rotational axis RA (see, e.g. dotted scanning beam lines in FIG. 1 which show beam paths after mirror 60 rotates 180 degrees from the orientation shown). Scanning beams 38 are projected from central spinner 60 at an inclination angle A4 to each other as shown.

In one embodiment, the resulting combined motion of the two conical scanning beams 38 as shown in FIG. 1 may produce two narrow Lissajous patterns that are spatially separated from each other to form a relatively aggressive and effective scanning pattern comprised of roughly parallel but varying scan lines. Notably, such a scanning pattern is advantageously produced according to the present invention with an optically and mechanically simple combination of moving and stationary mirrors as described herein.

With continuing reference to FIG. 1, sets of preferably stationary pattern mirrors 70 may be mounted in the scanner housing to redirect the two scanning Lissajous patterns comprised of scanning beams 38 in a desired single or multiple directions. In one possible embodiment, as shown, pattern mirrors 70 may therefore be positioned and aligned at various predetermined angles to rotational axis RA of central spinner 60 to achieve the desired directional delivery of the Lissajous scanning patterns striking mirrors 70 from central spinner 60. The two laser scanning patterns will in turn strike the barcode target 100, scan the target, and reflect light back towards laser scanning system 20 along generally the same path as the laser scanning beams 38 leaving the scanner. As noted herein, collection of the reflected light, signal processing, and decoding of the barcode target 100 may then be completed in a conventional manner using standard commercially-available photodetectors and signal processing circuitry for decoding the barcode target, such as described in one example in U.S. Pat. No. 7,431,215, which is incorporated herein by reference in its entirety.

In one embodiment as shown in FIG. 1, an upper set and lower set of pattern mirrors 70 may be provided which sets are spaced apart from each other. It should be noted that pattern mirrors 70 shown in FIG. 1 represent part of a partial or full circumferentially-extending circle or ring of mirrors 70 provided in each upper and lower mirror set. In some embodiments, therefore, pattern mirrors 70 form a multi-faceted partial or full circle or ring of mirrors which may comprise at least part of a mirrored cone. One representative example of a partial circle or ring of faceted pattern mirrors is shown in U.S. Pat. No. 7,431,215, which is incorporated herein by reference in its entirety. One representative example of a full circle or ring of faceted pattern mirrors is shown in U.S. Pat. No. 4,699,447, which is incorporated herein by reference in its entirety. It is well within the ambit of those skilled in the art to determine a suitable number, circumferential extent, and orientation or angle of the pattern mirrors 70 depending on the shape of the scanning beam pattern intended to be generated.

It will be readily appreciated by those skilled in the art that any suitable arrangement, orientation, number, and placement of pattern mirrors 70 may be provided depending on the application specific requirements of the scanning operation to be performed, configuration/type of scanner housing used, desired scanning pattern, etc. Furthermore, additional pattern mirrors may be provided other than those shown which further reflect and redirect the scanning beams 38 before the beams leave the scanner housing. Accordingly, the invention is expressly not limited to arrangement of pattern mirrors 70 shown and described herein which represent only some possible embodiments.

Figure 8:
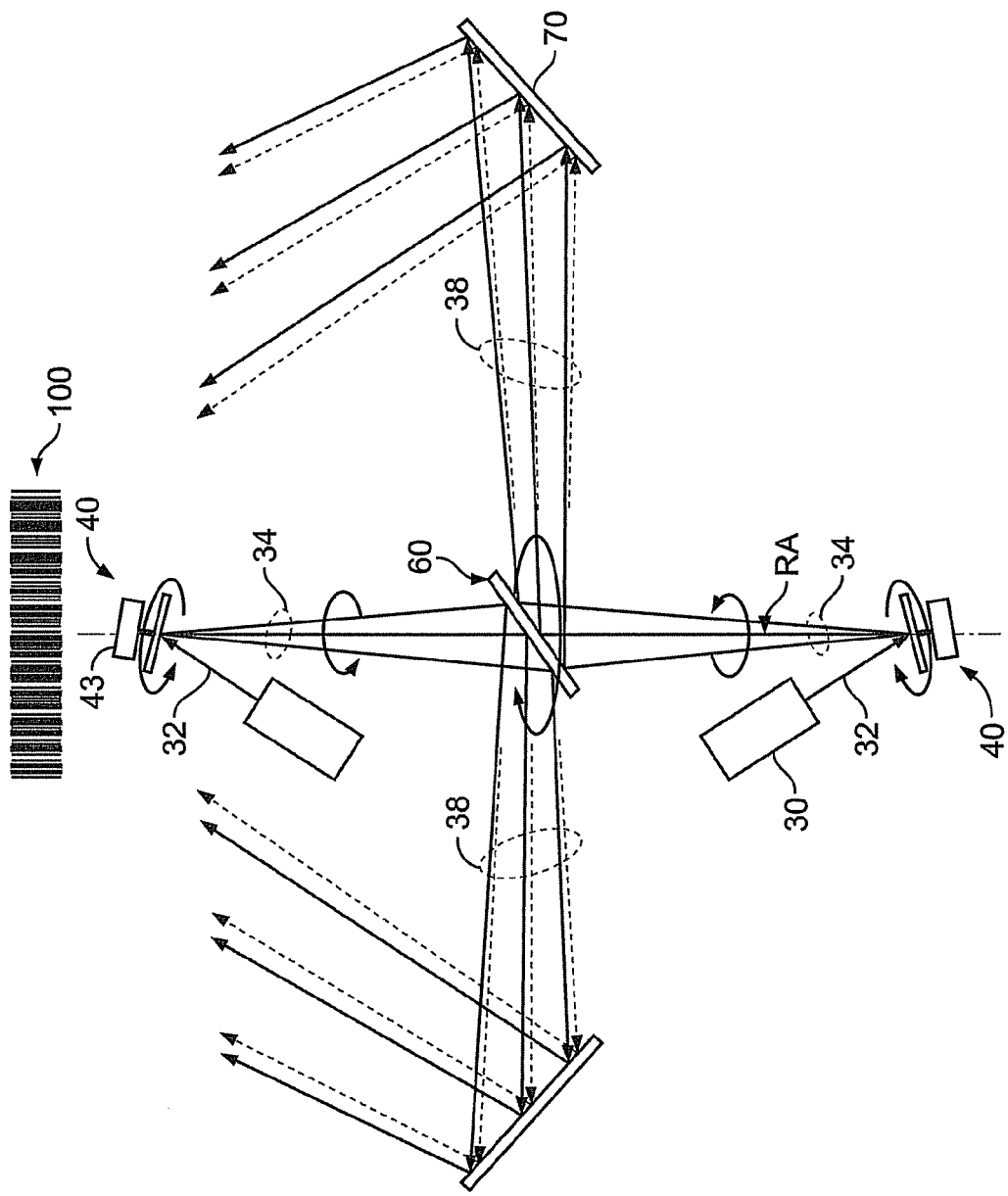
FIG. 8 is a schematic diagram of a laser scanning system according to a third embodiment of the present invention All drawings are schematic and are not drawn to scale.

In some embodiments of laser scanning system 20, as shown in FIG. 8, central spinner 60 may be disposed at an angle A1 of about 45 degrees (allowing for suitable manufacturing tolerances). In this embodiment, only the bottom set of pattern mirrors 70 would be required as shown. This would cause the two Lissajous scanning patterns to be substantially spatially coincident, instead of being spatially separated as described elsewhere herein with reference to FIG. 1 wherein angle A1 is adjusted for cone angle C1. Although the spatially coincident scanning patterns would produce fewer independent scanning field lines in the scanning pattern, the resulting scanning speed (or density) may be approximately doubled which may be more desirable in high-throughput product scanning applications. This may be appropriate, in some instances, where the physical extent of the scanning field is controlled and limited. In other applications where the scanning field is more variable and does not have defined bounds, it may be more desirable to have spatially separated scanning patterns with greater scanning field lines to allow the user to quickly scan the code without any thought put into orientation (i.e. omnidirectional) or to more quickly achieve the proper scanning distance from the product to read the barcode (i.e. depth of field extension).

In other embodiments of scanning system 20, regardless of the central spinner 60 angle A1 used, the two Lissajous scanning patterns may be adjusted to produce different focal distances. In some embodiments, this may be achieved by predetermined placement and alignment of the sets of pattern mirrors 70 (shown in FIG. 1) to focus each of the two Lissajous scanning patterns at a different point in the scanning field. This would produce an extend depth of field or range for reading either low or high resolution bar codes (with high resolution codes typically requiring closer focal distance for decoding).

Figure 7:
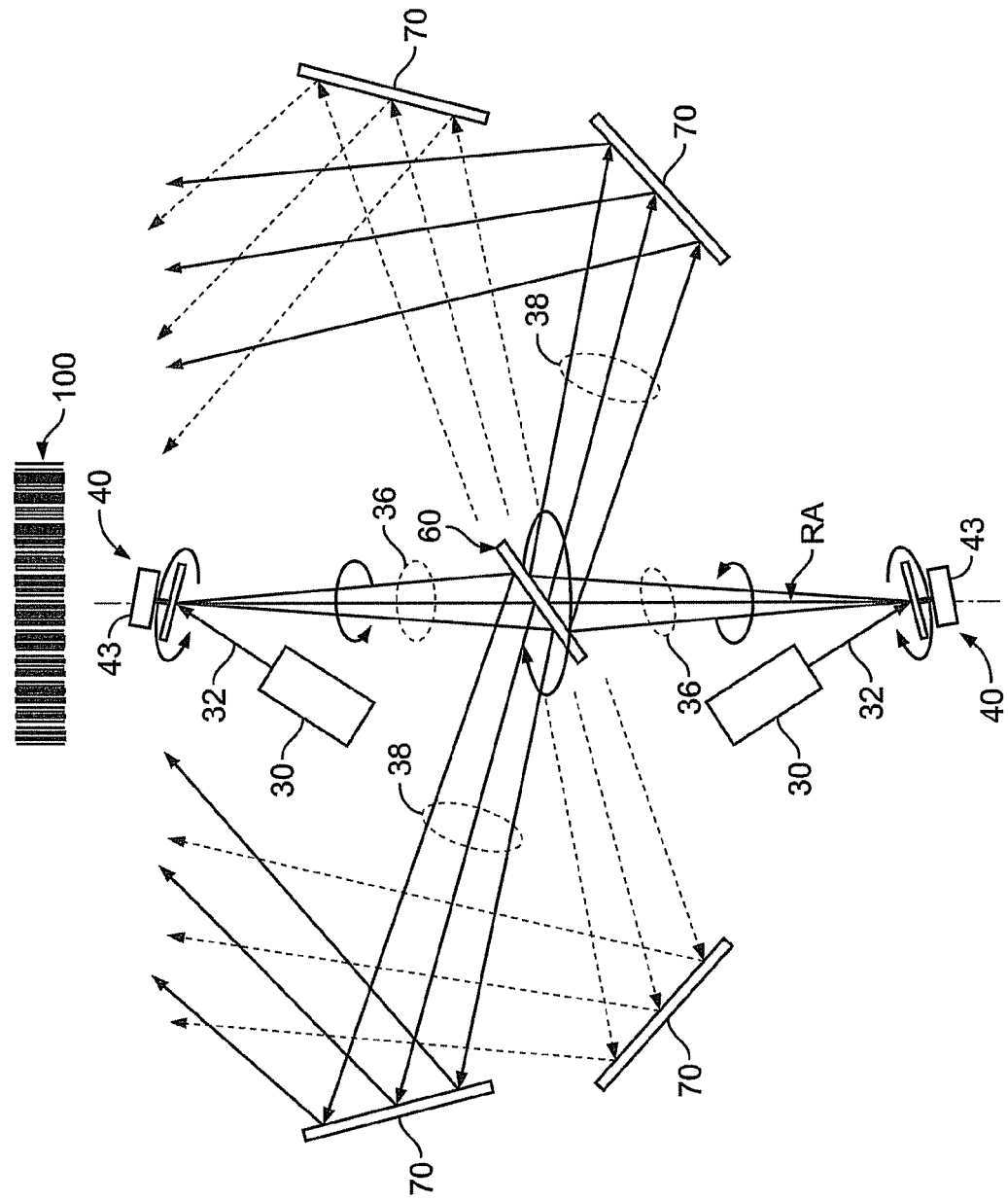
FIG. 7 is a schematic diagram of a laser scanning system according to a second embodiment of the present invention.

In other embodiments, as shown in FIGS. 7 and 8, directional mirrors 50 may be eliminated and wobbling mirrors 40 may be positioned to project first reflected laser beams or light cones 34 directly onto reflecting surfaces 61, 62 of central spinner 60. Accordingly, it will be appreciated that directional mirrors 50 are optional.

In yet other embodiments, patterns mirrors 70 may be positioned and aligned to direct the two Lissajous scanning patterns produced by scanning system 20 in different directions towards a common scanning field. Some stationary or fixed-mount retail scanners as shown in FIG. 4 combine both vertical and horizontal laser output windows 81, 83 respectively that view a single common scanning field or region for reading barcodes targets 100 on products that may be located on the bottom or sides of the products. Accordingly, scanning system 20 may be used in such fixed-mount scanners.

In other embodiments, a single laser diode 30 and single wobbling mirror 40 may be used and provided with a conventional beam splitter (not shown) positioned optically downstream of the wobbling mirror. The split light cone may then be projected using one or more directional mirrors 50 to strike each reflective surface 61, 62 of central spinner 60 as shown in FIG. 1.

Although various embodiments of the present invention are described herein showing some possible layouts and arrangement of elements including stationary and moving mirrored elements, it will be appreciated by those skilled in the art that other suitable arrangements of these elements may be used depending on the specific requirements of the intended application. Accordingly, the invention is not limited by these possible embodiments shown and described herein.

While the foregoing description and drawings represent preferred or exemplary embodiments of the present invention, it will be understood that various additions, modifications and substitutions may be made therein without departing from the spirit and scope of the present invention as defined in the accompanying claims. In particular, it will be clear to those skilled in the art that the present invention may be embodied in other specific forms, structures, arrangements, proportions, sizes, and with other elements, materials, and components, without departing from the spirit or essential characteristics thereof. One skilled in the art will appreciate that the invention may be used with many modifications of structure, arrangement, proportions, sizes, materials, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims, and not limited to the foregoing description or embodiments. Rather, the appended claims should be construed broadly, to include other variants and embodiments of the invention, which may be made by those skilled in the art without departing from the scope and range of equivalents of the invention.

What is claimed is:

1. A laser scanning system comprising:
   at least one laser source producing a pair of laser beams;
   a double-sided spinner having a first reflecting surface and a second reflecting surface each being disposed on opposites sides of said double-sided spinner, wherein said double-sided spinner is rotatable about a rotational axis, and
   wherein each of said first and second reflecting surfaces is positioned to receive and project one of said pair of laser beams from said first and second reflecting surfaces to form a pair of scanning beams operable to illuminate a symbology target; and
   at least one rotatable wobbling mirror positioned between said at least one laser source and one of said first and second reflecting surfaces, said wobbling mirror being rotated about an axis and receiving one of said pair of laser beams, and said wobbling mirror generating a conical laser beam that is projected onto one of said first and second reflecting surfaces of said double-sided spinner.

2. The laser scanning system of claim 1, wherein said pair of scanning beams are projected in opposite directions from said double-sided spinner.

3. The laser scanning system of claim 1, further comprising a first directional mirror axially aligned with the rotational axis of said double-sided spinner and in optical view of the first reflecting side of said double-sided spinner, wherein the directional mirror is positioned between said rotatable wobbling mirror, and said first reflecting side of said double-sided spinner is operative to receive and project one of said pair of laser beams onto the first reflecting side of said doubled-sided spinner.

4. The laser scanning system of claim 1, wherein two laser sources are provided.

5. The laser scanning system of claim 1, wherein said laser scanning system is housed in a portable or fixed-mount housing.

6. The laser scanning system of claim 1, further comprising a beam splitter that produces the pair of laser beams from a single laser source.

7. A laser scanning system comprising
   at least one laser source producing a pair of laser beams;
   a double-sided spinner having a first reflecting surface and a second reflecting surface disposed on opposites sides of said double-sided spinner, wherein said double-sided spinner is rotatable about a rotational axis, and
   wherein each of said first and second reflecting surfaces is positioned to receive and project one of said pair of laser beams from said first and second reflecting surfaces to form a pair of scanning beams operable to illuminate a symbology target;
   a pair of rotatable wobbling mirrors, each said wobbling mirror being rotated about an axis and being operative to receive and project one of said pair of laser beams onto one of the reflecting surfaces of said doubled-sided spinner; and first and second sets of pattern mirrors each respectively being positioned to receive one of said pair of scanning beams from said double-sided spinner, and wherein said double-sided spinner is disposed at an angle to said rotational axis to project two spatially separated Lissajous scanning patterns.

8. The laser scanning system of claim 7, wherein said first set of pattern mirrors is positioned to receive one of said pair of scanning beams from said first reflecting side of double-sided spinner, and said second set of pattern mirrors is positioned to receive one of said pair of scanning beams from said second reflecting side of said double-sided spinner.

9. The laser scanning system of claim 7, wherein each of said first and second sets of pattern mirrors comprises at least a partial ring of mirrors.

10. The laser scanning system of claim 7, wherein said double-sided spinner is disposed at about a 45 degree angle to said rotational axis, and further comprising a set of pattern mirrors that are positioned and aligned to project two spatially coincident Lissajous scanning patterns.

11. A laser scanning system comprising:
a pair of rotatable wobbling mirrors each being rotatable about an axis;
a double-sided mirrored spinner centrally positioned among said wobbling mirrors, wherein said double-sided spinner has a first reflecting surface and a second reflecting surface disposed on opposites sides of said double-sided spinner and is rotatable about a rotational axis;
a laser beam projected from one or more laser sources onto each reflecting surface of said double-sided spinner via said wobbling mirrors to produce a pair of rotating scanning beams for illuminating a symbology target; and
a stationary directional mirror disposed in an optical path between each said rotatable wobbling mirror and said double-sided spinner.

12. The laser scanning system of claim 11, wherein two laser sources are provided and each laser source projects a separate laser beam onto each one of said wobbling minors.

13. The laser scanning system of claim 11, further comprising a first and a second set of pattern mirrors, wherein said first set of pattern mirrors is positioned to receive one of the pair of scanning beams from the first reflecting side of said double-sided spinner, and wherein the second set of pattern mirrors is positioned to receive one of the pair of scanning beams from the second reflecting side of said double-sided spinner.

14. A laser scanning system comprising:
a housing;
a rotatable double-sided mirror having a first reflecting side and a second reflecting side, and wherein said rotatable double-sided mirror is rotatable about a rotational axis;
a first directional mirror axially aligned with said rotational axis and in optical view of the first reflecting side of said rotatable double-sided mirror;
a second directional mirror axially aligned with said rotational axis and in optical view of the second reflecting side of said rotatable double-sided mirror;
a first rotatable wobbling mirror positioned to receive a first laser beam and reflect said first laser beam to said first directional minor;
a second rotatable wobbling mirror positioned to receive a second laser beam and reflect said second laser beam to said second directional minor; and
wherein said first laser beam is transmitted onto the first reflecting side of said rotatable double-sided minor via said first wobbling mirror and said first directional mirror to produce a first scanning beam, and wherein said second laser beam is transmitted onto the second reflecting side of said rotatable double-sided mirror via said second wobbling mirror and said second directional mirror to produce a second scanning beam.

15. The laser scanning system of claim 14, wherein said wobbling mirrors each include a reflecting surface mounted on and rotated about a motor drive shaft, and wherein said reflecting surface of each wobbling mirror is disposed at an angle to said drive shaft to produce a conical laser beam.

16. The laser scanning system of claim 14, further comprising a first set of pattern mirrors and a second set of pattern mirrors, wherein said first set of pattern mirrors is positioned to receive said first scanning beam from the first reflecting side of said rotatable double-sided mirror, and wherein said second set of pattern mirrors is positioned to receive said second scanning beam from the second reflecting side of said rotatable double-sided mirror.

17. The laser scanning system of claim 16, wherein said rotatable double-sided mirror and said pattern mirrors produce two Lissajous scanning patterns.

\* \* \* \* \*